United States Patent Office 3,524,119
Patented Aug. 11, 1970

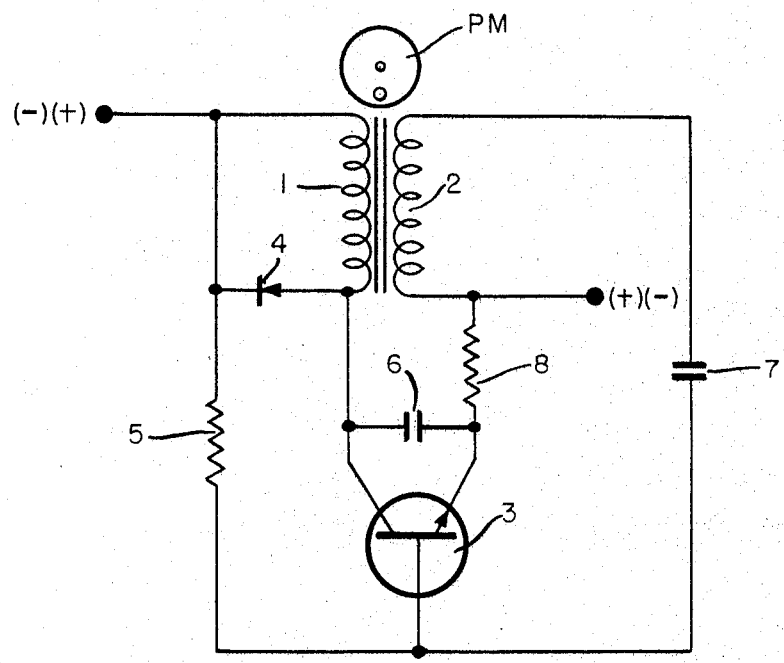

3,524,119
ELECTRICAL SELF-STARTING TIME KEEPING APPARATUS
Robert Walter Reich, Merzhauserstr. 143, Freiburg im Breisgau, Germany
Continuation of application Ser. No. 616,865, Feb. 17, 1967. This application Oct. 23, 1969, Ser. No. 868,948
Claims priority, application Germany, Mar. 22, 1966
R 42,906
Int. Cl. H02k 33/06
U.S. Cl. 318—128                                    2 Claims

ABSTRACT OF THE DISCLOSURE

An electrical time keeping apparatus utilizing a transistor blocking oscillator circuit having a driving coil connected to the collector of the transistor and a series connection of an exciter coil and capacitor means between the emitter and base, associated with a rocking or oscillating permanent magnet, characterized by a resistor between the transistor base and one side of the voltage source, and a further capacitor between the emitter and collector of the transistor, for causing the blocking oscillator to commence oscillations operative to initiate motion of the rocking magnet. The circuit also includes means for effecting voltage and temperature stabilization.

BACKGROUND OF THE INVENTION

This application is a continuation of my prior copending application Ser. No. 616,865, now abandoned. In my prior U.S. Pat. No. 3,100,278, issued Aug. 6, 1963, for "Electromagnetic Pendulum Drive" I have disclosed an electrical time keeping apparatus utilizing a contact-lens electronic oscillator circuit as the controlling and driving circuit. A transistor is connected as a blocking oscillator and includes an exciter coil which is coupled to the emitter of the transistor, and a driving coil connected to the collector. The two coils are decoupled from one another to an extent sufficient normally to prevent oscillations from occurring; and rocking permanent magnet balance means, swinging over said coils, serves to periodically couple the coils to one another to permit oscillations, and simultaneously induces a controlling pulse in the exciter coil operative to trigger the blocking oscillator so as to effect a driving pulse in the driving coil operative to sustain periodic motion of the balance means.

The circuits described in my aforementioned prior patent requires that the permanent magnet balance means be in motion so that it can effect the functions described. Until motion is actually started, however, e.g. by physically shaking the time keeping apparatus, the oscillator will not go into its oscillator condition; and the permanent magnet rocker will remain stationary.

It is accordingly an object of the present invention to provide a modified form of the circuit shown in my prior patent, which includes starting circuit means operative to bring the blocking oscillator into an oscillating condition even though the magnet rocker is stationary, thereby to effect self-starting of the mechanical rocker motion due to magnetic attraction or repulsion between the field produced in the blocking oscillator driving coil and the rocker. In this respect, while some self-starting electronic timing apparatus has been suggested heretofore, none of these apparatuses have contemplated such self-starting in a blocking oscillator, particularly a blocking oscillator of the type shown in my prior patent.

The circuit of the present invention is further characterized by the inclusion of circuit components rendering the rocker motion insensitive to voltage changes in the voltage source of the blocking oscillator, and also rendering the overall system insensitive to temperature effects. Again, while voltage and temperature stabilization have been suggested in the past, the particular circuits utilized herein have not been suggested.

SUMMARY OF THE INVENTION

The present invention contemplates the provision of an electrical timing apparatus of the general type described in my prior Pat. No. 3,100,278; and reference is made to that patent for descriptions of the structures, and their operation, which can be employed. The number and arrangement of the magnets and coils provided may be varied in accordance with the purpose of the time keeping apparatus, e.g. as a house clock, a radio clock timer, a car clock, etc. The new form of circuit suggested herein is particularly characterized by the addition of starting circuit means adapted to bring the blocking oscillator into an oscillating condition without the induction of an excitation pulse by the magnet means in said exciter coil, whereby self-starting of the mechanical rocker can be effected.

To this effect, a capacitor is inserted in series with the exciter coil between the emitter and the base of the transistor, resistance means are disposed between the base of the transistor and one side of the voltage source, and second capacitor means are disposed between the emitter and collector of the transistor. The overall circuit thus provides an RC timing circuit connected across the oscillator voltage source adapted to unblock the oscillator at the null point, or just outside of the null point, of the mechanical rocker. The resultant signal produced in the driving coil causes the rocking to start; and once it is started, it is sustained by the production of an excitation pulse in the exciter coil in accordance with the normal operation of the oscillator described in my prior patent. The RC time constant of the starting circuit is chosen to be substantially longer than the period of a plurality of successive pulses induced in the exciter coil by the mechanical rocker moving at its normal rate; and therefore, once the system has gone into its normal operating state, the parameter values of the RC starting circuit can be substantially ignored. Nevertheless, the starting circuit is still operative, to some extent, to stabilize the frequency of rocking motion achieved by the mechanical rocker since variations in said frequency will manifest themselves in a variation in the charge on the capacitor coupled to the exciter coil, operative to so vary the base excitation of the transistor as to automatically adjust the rocker frequency.

The system further includes voltage and temperature stabilization means comprising a resistor coupled to the transistor emitter, and a further element such as a silicon diode, selenium rectifier, and/or Zener diode connected across the driving coil. The arrangement is such that voltage and temperature stabilization is achieved without producing any cancellation of the blocking oscillator characteristics.

BRIEF DESCRIPTION OF THE DRAWING

The single drawing accompanying this application shows a circuit constructed in accordance with a preferred embodiment of the present invention.

DESCRIPTION OF THE PREFERRED EMBODIMENT

In accordance with the present invention, a blocking oscillator of the type shown in my prior Pat. No. 3,100,278, may comprise a transistor 3 having a driving coil 1 connected between the collector of said transistor and one side of a DC voltage source V. The transistor emitter is coupled to the other side of said voltage source V through resistor 8, and an exciter coil 2 is connected between the emitter and base of the transistor. The transistor 3 may comprise a silicon transistor of either the p-n-p or n-p-n type; and the actual polarity of the voltage source V will, of course, depend upon the type of transistor employed.

The form of circuit thus far described is operative to act as a blocking oscillator when the coils 1 and 2 are appropriately coupled to one another by motion of a swinging permanent magnet PM. It is to be noted that, as disclosed in my Pat. 3,100,278 the mechanical arrangements are such that absent the permanent magnet PM the coils 2 and 3 cannot be coupled. When and only when the permanent magnet PM is in its null position does effective magnetic coupling exist between coils 1 and 2. This magnet PM may be arranged in various configurations to provide a pendulum or balance-wheel type of structure; and the actual number and arrangement of the magnets and coils provided depends upon the purpose of time keeping apparatus. In this respect, attention is invited to my aforementioned prior patent.

In accordance with the present invention, the connection between the exciter coil 2 and the base of transistor 3 includes a capacitor 7 in series with coil 2; and a resistor 5 is disposed betwen the base of transistor 3 and one side of the voltage V as illustrated. In addition, the collector and emitter of the transistor are interconnected by a capacitor 6. With this modified structure, the blocking oscillator can be triggered into operation even without the induction of an exciting pulse in the exciter coil 2.

More particularly, when voltage source V is applied to the circuit, capacitor 7 first charges up through resistor 5 to the point that an unblocking of the oscillator occurs. The oscillations which result, cause the mechanical rocker PM to start rocking by means of the attraction or repulsion exerted by the magnetic fields of the drive coil 1 and the permanent magnet (or magnets) PM. Once the rocking is started, however, it is sustained by the production of an excitation pulse in the exciter coil 2. Without the capacitor 6, this rocking motion could not develop, because the oscillator's oscillation could not be equalized.

Resistor 8 connected between the transistor emitter and the lower side of voltage source V, and diode 4 connected across driving coil 1 between the transistor collector and the upper side of voltage source V, serve to effect temperature and voltage stabilization within wide limits. Resistor 8 serves to limit the current which can flow through the resistor. The diode 4 can constitute a silicon diode, a selenium rectifier, or several of these elements, or can take the form of a Zener diode. In any event, these components achieve voltage and temperature stabilization without cancelling the blocking oscillator characteristics. The amplitude of swing of the rocker thus does not vary from the highest to the lowest battery voltage, nor does temperature have any effect on the magnitude of the driving pulse.

The circuit illustrated has the particular advantage that a blocking oscillator is employed in such manner that occurrence of the oscillation in the oscillator produces self-starting of the timing apparatus and, at the same time, a stabilization of the amplitude of the swing of the mechanical rocker is effected. In this respect, the time required for the charging of capacitor 7 through the resistor 5 is important only during starting, since the time constant of this portion of the circuit is intentionally chosen to be substantially longer than the recurrent excitation at the exciter coil 2 as soon as the mechanical rocker has reached its correct rate of swing. Thus, the starting circuit operates efficiently to cause oscillations of the oscillator during the start of the time keeping operation, and is then for all practical purposes put out of operation. The capacitor 6 produces no damping of the system, but sustains the oscillations of the oscillator under all circumstances, even when the excitation through exciting coil 2 tends to block the transistor. Thus, during the running pulse generation, controlled oscillator oscillations exist, and the entire system operates as a blocking oscillator in the manner described in my prior patent.

The improvement makes it possible to construct time pieces which make use of the blocking oscillator principles to start themselves, and which are entirely voltage stabilized and temperature stabilized. Capacitor 7 offers practically no impedance at the oscillator frequency, since the circuit remains closed through capacitor 6. Only the circuit constants of the blocking oscillator circuit determine the driving impulses, the same as before. The entire system will, of course, still be effective if a plurality of magnets are disposed on the balance-wheel rocker.

In designing the apparatus described, one need only see to it that a close coupling exists between the driving coil 1 and the exciting coil 2, so that an oscillator is created. By proper selection of the resistor 5 and the capacitor 7, in relation to the time constant of these elements, good stabilization of the vibration amplitude can be achieved. If the frequency of the mechanical rocker decreases, a stronger driving pulse will be produced in coil 1 due to the charging of capacitor 7 by a higher base excitation. Conversely, if the frequency of the rocker increases, the change in base excitation will so vary the driving pulse produced as to retard the swinging motion of the rocker. The correct base excitation for a selected frequency of the mechanical rocker is thus automatically adjusted to sustain the selected frequency.

Having thus described my invention, I claim:
1. An electronic timing apparatus comprising,
   a transistor having a base, collector and emitter,
   a driving coil connected to said collector,
   an exciter coil connected in the emitter-base circuit,
   a first capacitor in the emitter-base circuit in series with said exciter coil,
   a first resistor connected between the base of said transistor and a terminal of a power supply,
   a second capacitor connected between said collector and said emitter,
   a second resistor connecting said emitter to the opposite terminal of said power supply,
   a mechanical oscillator including means for magnetically coupling said exciter and drive coils when and only when said mechanical oscilator is in neutral undisplaced position,
   the mechanical oscillator further comprising a permanent magnet for inducing a voltage pulse in said exciter coil when said oscillator passes through said neutral position,
   said transistor operating as a blocking oscillator having a predetermined period of operation,
   said mechanical oscillator having a period which is less than said predetermined period.
2. The timing apparatus of claim 1 in which a unidirectionally conductive device is connected across said drive coil.

References Cited

UNITED STATES PATENTS

| | | | |
|---|---|---|---|
| 2,945,168 | 7/1960 | Steinke | 318—128 |
| 2,959,746 | 11/1960 | Sears | 331—116 |
| 2,962,643 | 11/1960 | Kwartiroff et al. | 318—132 |
| 3,100,278 | 8/1963 | Reich | 318—132 X |
| 3,225,536 | 12/1965 | Reich | 331—112 X |
| 3,277,394 | 10/1965 | Holt et al. | 331—116 |
| 3,336,537 | 8/1967 | Reich | 331—116 |
| 3,349,306 | 10/1967 | Buck | 318—132 X |
| 3,359,473 | 12/1967 | Negri | 318—132 X |

DONOVAN F. DUGGAN, Primary Examiner

U.S. Cl. X.R.

58—23; 318—132; 331—116